United States Patent [19]
Mittman

[11] 3,741,287
[45] June 26, 1973

[54] GAS TURBINE REGENERATOR ASSEMBLY AND ASSEMBLY METHOD

[75] Inventor: Jerome J. Mittman, Dearborn Heights, Mich.

[73] Assignee: Ford Motor Company, Dearborn, Mich.

[22] Filed: Sept. 20, 1971

[21] Appl. No.: 181,925

[52] U.S. Cl. ............... 165/8, 64/11 R, 64/27 NM, 74/443, 74/446, 29/159.2, 29/451
[51] Int. Cl. ......................................... F28d 19/04
[58] Field of Search............................ 165/8, 10, 9; 64/11 R, 27 NM; 74/443, 446; 29/159.2, 451

[56] References Cited
UNITED STATES PATENTS

| | | | |
|---|---|---|---|
| 2,060,565 | 11/1936 | Geyer | 74/443 X |
| 2,272,900 | 2/1942 | Saurer | 64/11 R |
| 2,325,132 | 7/1943 | Haushalter et al. | 64/11 R X |
| 3,342,530 | 9/1967 | Krekeler | 64/11 R X |
| 3,525,384 | 8/1970 | Horton | 165/8 X |
| 3,666,000 | 5/1972 | Blech et al. | 165/8 |

Primary Examiner—Albert W. Davis, Jr.
Attorney—Keith L. Zerschling and Robert W. Brown

[57] ABSTRACT

A gas turbine regenerator assembly and assembly method are described. The regenerator assembly comprises a cylindrical regenerator core, an annular drive member surrounding the cylindrical surface of the regenerator core and separated from it to define an annular space, and a resilient material positioned in the annular space between the drive member and regenerator core. A mounting ring is also located in the annular space. The mounting ring has a discontinuity in it which permits its diameter to be varied to compress the resilient material during assembly. The assembly method of the invention includes the steps of surrounding the cylindrical surface of the regenerator core with the resilient material, placing the annular mounting ring around the resilient material and regenerator core, applying forces to the mounting ring to reduce its diameter, positioning the drive member around the mounting ring, and reducing the previously applied forces to permit the mounting ring diameter to increase.

6 Claims, 3 Drawing Figures

PATENTED JUN 26 1973 3,741,287
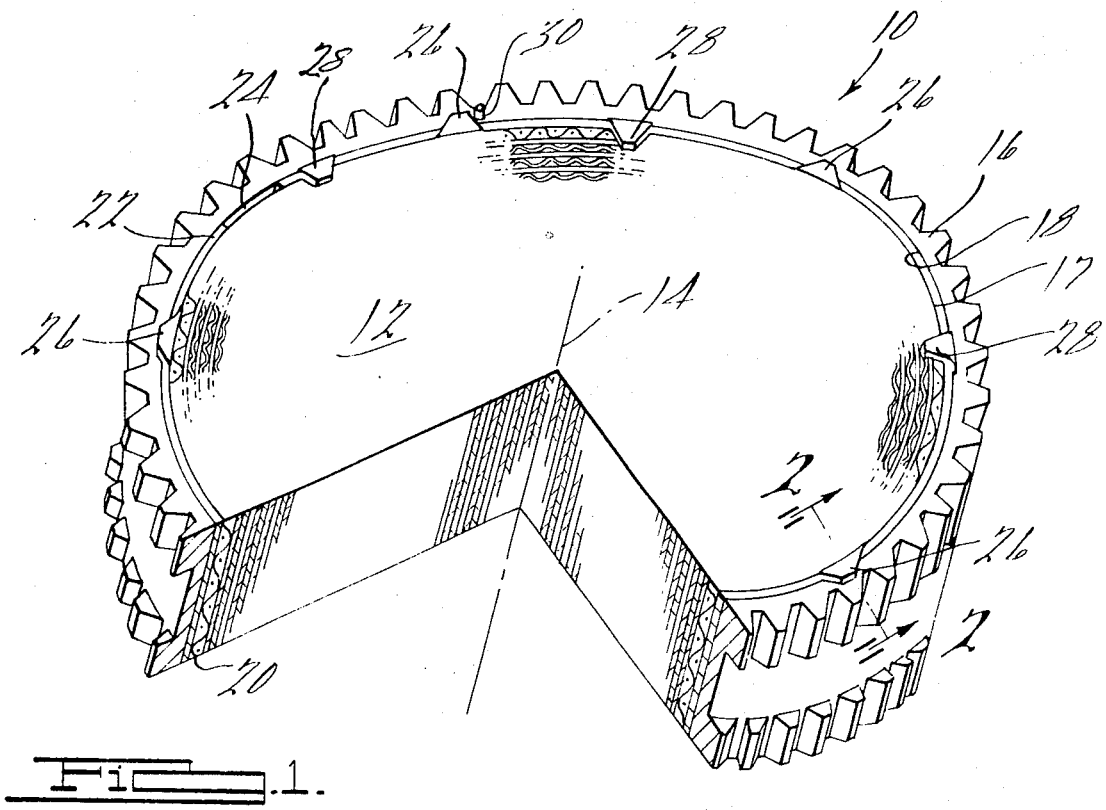
FIG. 1.
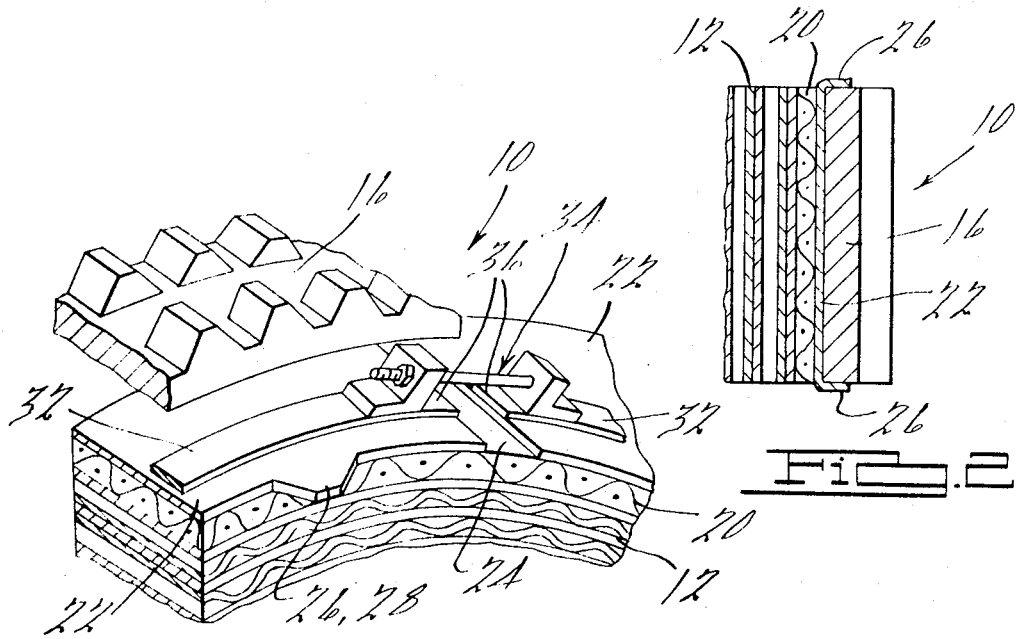
FIG. 2.
FIG. 3.
INVENTOR.
Jerome J. Mittman
BY Keith L. Zerschling
Robert W. Brown
ATTORNEYS

GAS TURBINE REGENERATOR ASSEMBLY AND ASSEMBLY METHOD

BACKGROUND OF THE INVENTION

This invention relates to a gas turbine regenerator assembly and to a method for its assembly.

In a gas turbine engine, an air-fuel mixture is burned in a combustion chamber to form hot gases which are directed to a turbine wheel to produce rotary motion of an engine output shaft. After these gases have impinged upon the turbine wheel, and prior to their being exhausted from the engine, it is desirable to extract as much heat energy as possible. The efficiency of the gas turbine engine is increased by transferring the heat energy extracted from these exhaust gases to the compressed intake air prior to its mixture with the fuel and entry into the combustion chamber. One type of heat exchanger that is used to accomplish this energy transfer which raises the temperature of the incoming compressed air is called a regenerator.

A heat exchanging system which employs a rotating cylindrically-shaped regenerator core has been found to be particularly suitable for gas turbine engines. Typically, this regenerator core is made from a ceramic material and is porous to gases which flow substantially parallel to the rotational axis of the core. The porous, ceramic regenerator core rotates in a housing that is divided into a plurality of passages. Hot exhaust gases and the cooler compressed incoming air pass through these passages and through the porous regenerator core. The exhaust gases heat the regenerator core and the regenerator core, in turn, transfers this absorbed heat energy to the cooler compressed incoming air. In this manner, heat transfer results.

Means must be provided for rotating the ceramic regenerator core. Typically, this is accomplished with an annular metal drive member in the form of a ring gear which surrounds the exterior periphery or cylindrical surface of the regenerator core. Because the annular metal drive member and the ceramic regenerator core have substantially different thermal coefficients of expansion, they should not be directly in contact with one another. For this reason, the annular drive member is spaced from the ceramic regenerator core, and a resilient material is provided for transmitting torque from the annular drive member to the regenerator core.

In the past, the resilient material for transmitting torque from the annular drive member to the regenerator core has taken various forms. For example, in U.S. Pat. No. 3,363,478 issued to John G. Lanning, the resilient material comprises spring band segments compressed between the annular ring gear and the cylindrical surface of the regenerator core. In U.S. Pat. No. 3,430,687, issued to David J. S. Wardale, the resilient material is a plurality of bow-like spring elements. In U.S. Pat. No. 3,525,384 issued Aug. 25, 1970, and assigned to the Ford Motor Company, the resilient material described is an elastomeric pad compressed between the inner surface of the annular drive member and the cylindrical surface of the regenerator core. A particularly satisfactory resilient material is a wire mesh described in U.S. Pat. No. 3,666,000 issued May 30, 1972, in the names of Antoni Paluszny and Joab J. Blech and assigned to the Ford Motor Company.

SUMMARY OF THE INVENTION

One of the difficulties encountered in the assembly of the regenerator core and its drive member involves the placement of the resilient material in the annular space formed between the regenerator core and drive member. This can be a tedious and time-consuming operation, particularly, where an elastomeric or wire mesh material is used.

The method of the invention reduces the tedium and time consumption required to form the regenerator assembly, and at the same time results, if desired, in a novel regenerator core assembly having advantages over prior art designs.

In accordance with the method of the invention, a regenerator assembly is formed by first surrounding the cylindrical surface of a regenerator core with a resilient material. An annular mounting ring having a discontinuity which permits its diameter to be varied is then placed around the resilient material and cylindrical regenerator core. Following this, forces are applied to the annular mounting ring to reduce its diameter and simultaneously to compress the resilient material. A drive member for the regenerator core, such as a ring gear, is then positioned around the mounting ring. A subsequent reduction or removal of the forces previously applied to the mounting ring permits its diameter to increase so that the mounting ring can contact the inner surface of the drive member in a frictional engagement therewith. If desired, the mounting ring can be removed from the regenerator assembly either without first releasing the forces applied to the mounting ring or after reducing such forces.

If the mounting ring is not removed, then a novel regenerator assembly is formed. The novel regenerator assembly comprises the regenerator core, the drive member surrounding the cylindrical surface of the regenerator core, a resilient material positioned between the regenerator core and the drive member, and the mounting ring positioned between the resilient material and the drive member. Preferably, the mounting ring has a plurality of tabs located on either or both of its sides. Prior to assembly, the tabs extend axially from the annular mounting ring, but after assembly they may be bent to positions extending radially outward or radially inward, or both, for the purpose of limiting axial movement of the mounting ring relative to the drive member and the resilient material. Also, the drive member may have a protrusion extending in an axial direction and positioned to engage one of the tabs on the mounting ring, thereby, to prevent rotational movement of the mounting ring relative to the drive member.

The method of the invention, and the novel structure for a regenerator assembly that can be formed by use of this method, may be better understood by reference to the specification which follows and to the drawings.

BRIEF DESCRIPTION OF THE DRAWINGS

FIG. 1 is a pictorial sectional view of a regenerator assembly constructed in accordance with the invention;

FIG. 2 is a sectional view of a portion of the regenerator assembly of FIG. 1, the section being taken along the line 2—2 in FIG. 1; and FIG. 3 is a partial pictorial sectional view illustrating the assembly method of the invention.

DETAILED DESCRIPTION OF THE INVENTION

With reference now to FIG. 1, a novel regenerator assembly is generally designated by the numeral 10.

Regenerator assembly 10 includes a regenerator core 12, preferably made from a ceramic material and porous to gases flowing substantially parallel to the axis 14 of the regenerator core and of the other parts of the assembly 10. The regenerator core 12 has a cylindrical shape, and its cylindrical surface is surrounded by a drive member in the form of a ring gear 16. The drive member 16 has an inner surface 18 that is of a diameter greater than the outer diameter 17 of the cylindrical regenerator core 12. Thus, when the annular drive member 16 is positioned around the regenerator core 12, an annular space is formed between the inner surface of the drive member and the cylindrical surface of the regenerator core.

A resilient material 20, shown in the drawings as a wire mesh, is positioned between the cylindrical surface of the regenerator core 12 and the inner surface of the drive member 16. The resilient material 20 is necessary because of the dissimilar thermal characteristics of the regenerator core and drive member.

Positioned between the regenerator core 12 and the drive member 16 is a mounting ring 22. The mounting ring 22 has an annular shape, preferably is made from metal, and has a discontinuity at location 24 to permit its diameter to be varied. Preferably, the mounting ring 22 also has a plurality of tabs 26 which extend radially outward in the regenerator assembly, and a plurality of tabs 28 which extend radially inward in the regenerator assembly may also be provided. These tabs are located on both of the edges of the mounting ring 22. The sectional view of FIG. 2 illustrates how the tabs 26 engage the drive member 16 to prevent axial movement of the mounting ring 22 relative to the drive member 16. The tabs 28, which are not shown in FIG. 2 but which may extend radially inward as shown in FIG. 1, prevent axial movement of the resilient material 20 relative to the mounting ring 22. The use of the tabs 26, and particularly of the tabs 28, is not mandatory.

The drive member 16 may be provided with one or more protrusions, such as a pin 30, positioned to engage one or more of the tabs 26. This prevents rotational movement of the mounting ring 22 relative to the drive member 16 once the pin has engaged the tab.

FIG. 3 illustrates the assembly method of the invention. The method of the invention may be used to form one of the prior art structures, which does not include the mounting ring 22, or it may be used to form the novel regenerator assembly illustrated in FIG. 1. In either case, the regenerator assembly formed includes the cylindrical regenerator core 12, the annular drive member 16, and the resilient material 20 positioned between the drive member and the regenerator core.

In accordance with the assembly method, the regenerator core 12 is surrounded on its cylindrical surface with the resilient material 20. The annular mounting ring 22 is then placed around the subassembly formed by the resilient material 20 and the regenerator core 12. The mounting ring 22 has the discontinuity 24 which permits its diameter to be varied, and, preferably, it also has tabs 26 and/or 28 which extend axially at this point in the assembly method. After the mounting ring 22 has been placed around the resilient material and regenerator core, forces are applied to it to reduce its diameter and simultaneously to compress the resilient material 20. The application of forces may be accomplished in various ways, but in FIG. 3 an adjustable strap 32 is used. The strap 32 is provided with adjustment means, such as adjustable screw and block arrangement 34 used to draw the ends 36 of the strap 32 toward one another.

After the diameter of the mounting ring 22 has been reduced and the resilient material 20 compressed, the drive member 16 is positioned around the mounting ring 22. If a device such as the strap 32 has been used to reduce the diameter of the mounting ring 22, then the drive member 16 cannot be positioned in full alignment with the subassembly consisting of the regenerator core 12, resilient material 20, and mounting ring 22. Therefore, it is necessary to first remove the strap 32 or other device prior to positioning the drive member 16 in full alignment with the remainder of the regenerator assembly. In any event, the forces previously applied to the mounting ring to reduce its diameter are reduced or removed to permit its diameter to increase. This allows the surface of the mounting ring 22 to engage the inner surface of the drive member 16. Frictional forces produced by the resilient material and, perhaps also by the mounting ring 22, provide the means for transmitting torque from the drive member 16 to the regenerator core 12 so that it may be rotated.

At this point in the assembly operation, the mounting ring 22 may be withdrawn from the assembly 10 by the application of axial forces to the drive member 16, and to the regenerator core 12 and resilient material 20, while at the same time applying an oppositely directed axial force to the mounting ring 22. Alternatively, the novel structure of FIG. 1 may be produced by leaving the mounting ring 22 in the assembly. If the tabs 26 and 28 are used, they are then bent to their respective radially-outward or radially inward positions.

Based upon the foregoing description of the invention, what is claimed and desired to be protected by Letters Patent is:

I claim:

1. A gas turbine regenerator assembly, which comprises: a cylindrical regenerator core, said regenerator core being porous to gases flowing substantially parallel to its axis; an annular drive member surrounding the cylindrical surface of said regenerator core, said annular drive member having an inner diameter greater than the diameter of said regenerator core, an annular space thereby being formed between the inner surface of said annular drive member and the cylindrical surface of said regenerator core; a resilient material positioned in said annular space between said drive member and said regenerator core; and an annular mounting ring, said mounting ring having a discontinuity therein to permit its diameter to be varied, said mounting ring substantially surrounding said resilient material and said regenerator core, said mounting ring being positioned in said annular space and between said resilient material and the inner surface of said annular drive member, and means preventing circumferential movement of said drive member relative to said ring.

2. A regenerator in accordance with claim 1, wherein said annular mounting ring further includes at least one tab extending radially outward from its annular portion and wherein said circumferential movement prevention means comprises a protrusion on said annular drive member extending in an axial direction, said protrusion being positioned to engage said tab on said mounting ring, thereby, to prevent rotational movement of said mounting ring relative to said drive member.

3. A regenerator assembly in accordance with claim 1, wherein said annular mounting ring further includes a plurality of tabs extending radially outward from its annular portion for preventing axial movement of said mounting ring relative to said drive member.

4. A regenerator assembly in accordance with claim 1, wherein said annular mounting ring further includes a plurality of tabs extending radially inward from its annular portion for preventing axial movement of said resilient material relative to said mounting ring.

5. A regenerator assembly in accordance with claim 3, wherein said annular mounting ring further includes a plurality of tabs extending radially inward from its annular portion for preventing axial movement of said resilient material relative to said mounting ring.

6. A regenerator assembly in accordance with claim 5, wherein said assembly further comprises a protrusion on said annular drive member, said protrusion being positioned to engage one of said radially outwardly extending tabs on said mounting ring, thereby, to prevent rotational movement of said mounting ring relative to said drive member.

* * * * *